United States Patent [19]

Tanagawa et al.

[11] Patent Number: 4,875,156

[45] Date of Patent: Oct. 17, 1989

[54] COMPUTER HAVING A PROTECTION DEVICE TO SELECTIVELY BLOCK INCORRECT CONTROL SIGNALS

[75] Inventors: Kouji Tanagawa; Tomoaki Yoshida, both of Tokyo, Japan

[73] Assignee: Oki Electric Industry Co., Ltd., Tokyo, Japan

[21] Appl. No.: 22,062

[22] Filed: Mar. 3, 1987

[30] Foreign Application Priority Data

Mar. 5, 1986 [JP] Japan .................................. 61-46381

[51] Int. Cl.$^4$ ............................................. G06F 11/00
[52] U.S. Cl. .................................... 364/200; 371/12; 371/19
[58] Field of Search ... 364/200 MS File, 900 MS File; 371/10, 12, 19

[56] References Cited

U.S. PATENT DOCUMENTS

| 4,566,103 | 1/1986 | Sato et al. ............................... 371/38 |
| 4,644,539 | 2/1987 | Sato ....................................... 364/900 |
| 4,653,018 | 3/1987 | Stadlmeier et al. .................. 364/900 |

FOREIGN PATENT DOCUMENTS

| 0109504 | 5/1984 | |
| 0004848 | 1/1981 | Japan ..................................... 371/12 |
| 0031143 | 3/1981 | Japan ..................................... 371/10 |
| 0055460 | 4/1982 | Japan ..................................... 371/19 |
| 0024951 | 2/1983 | Japan ..................................... 371/19 |
| 61-95462 | 5/1986 | Japan . |
| 0133436 | 6/1986 | Japan . |

OTHER PUBLICATIONS

Shinjirou Toyoda, "Program Protecting Circuit", Patent Abstracts of Japan, vol. 7, No. 146, Jun. 25th, 1983.
Norio Tanaka, "Controlling Circuit of Program of Microcomputer", Patent Abstracts of Japan, vol. 5, No. 17, Jan. 31st, 1981.
Yukio Kobayashi, "Storage Protecting System of Control Storage", Patent Abstracts of Japan, vol. 9, No. 83, Apr. 12th, 1985.
Mutsuo Saitou; "Address Controlling System of Partially Mounted Control Memory", Patents Abstracts of Japan, vol. 7, No. 202, Sep. 7th, 1983.
Takeshi Nakatani; "Detection for Program Exception of Computer", Patent Abstracts of Japan, vol. 7, No. 286, Dec. 21st, 1983.
Mutsuo Saitou, "Microprogram Controller", Patent Abstracts of Japan, vol. 7, No. 210, Sep. 16th, 1983.

Primary Examiner—Andrew J. James
Assistant Examiner—Viet Q. Nguyen
Attorney, Agent, or Firm—Spencer & Frank

[57] ABSTRACT

In a computer having a program including a first type of instruction and a second type of instruction, a program memory has a first area for storing the first type of instruction and a second area for storing the second type of instruction. An address code is supplied from a program counter to the program memory, which thereby produces an instruction code stored at the addressed memory location. A control unit is responsive to the instruction code from the program memory for producing a control signal for controlling the operation of the computer. A protection circuit is provided for preventing execution of the first type of instruction when the address code output from the program counter does not designate any memory location in the first area.

8 Claims, 3 Drawing Sheets

FIG. 3
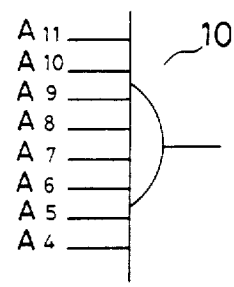
FIG. 4A      FIG. 4B
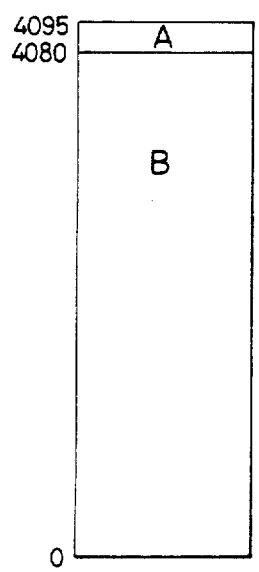 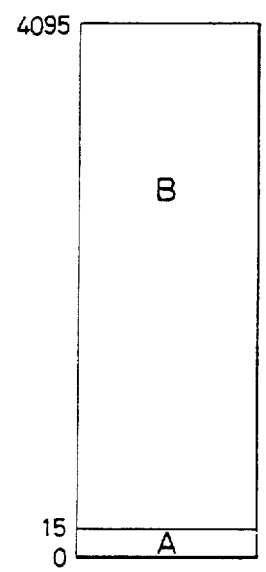

COMPUTER HAVING A PROTECTION DEVICE TO SELECTIVELY BLOCK INCORRECT CONTROL SIGNALS

BACKGROUND OF THE INVENTION

The present invention relates to a computer, such as a microcomputer, and particularly to an improvement for preventing erroneous execution of certain types of instructions.

In recent years, application of microcomputers has been widespread, examples being IC (integrated circuit) cards and controllers. Microcomputers are sometimes used in an undesirable or severe environment, for instance where the microcomputer is subject to electrostatic charge, incorrect voltage or the like. It has therefore been required to provide a measure for preventing the erroneous operation of the microcomputers.

Where the microcomputer is incorporated in an IC card, examples of the erroneous operation include alteration of important recorded data such as a password, the remaining amount of money (in an IC card), and a stop at an undesirable position in the program.

A problem associated with the prior art microcomputer is described with reference to FIG. 1. Instructions of the microcomputer are stored in a program memory which is typically formed of a ROM (read-only-memory) 1. The contents of the program counter 2 are decoded by an address decoder 3 and instructions stored in the corresponding memory locations are read out in turn. Each instruction is retained in an instruction register 4 and output to a control unit 5, which decodes the instruction and produces a control signal for executing the instruction. The control signal is, for example, applied to a gate or gates controlling the transfer of data or clocks.

In such a microprocessor, electrostatic charge, incorrect voltage, or the like may change the control signal, so that the altered control signal no longer corresponds to the instruction. As a result, a signal of a write instruction for an EPROM (electrically programmable read only memory) or EEPROM (electrically erasable and programmable read only memory) or a signal of a stop instruction may be erroneously produced. Such an error may cause writing of erroneous data or stop of the program processing, and return to the original program may become difficult. Where the program and data are stored in the same memory, e.g., an EEPROM, at different memory locations, the program may be altered and the operation is disabled.

When a stop signal on a line 6 from the control unit 5 is made to rise to the "high" level, a gate 8 for an internal clock 7 is closed, prohibiting delivery of the signal from the clock 7 to various parts of the microcomputer, whose operation is thereby halted.

SUMMARY OF THE INVENTION

An object of the invention is to reduce the possibility of erroneous execution of an important control signal, e.g., a control signal of a writing instruction or of a stop instruction.

According to the invention, there is provided a computer for executing a program stored therein, said program having a first type of instruction and a second type of instruction, said computer comprising:

a program memory having a first area for storing said first type of instruction and a second area for storing said second type of instruction, a program counter providing an address code, said program memory being responsive to the address code for producing an instruction code stored at the memory location designated by the address code, a control unit responsive to the instruction code from the program memory for producing a control signal for controlling the operation of the computer, and protection means for preventing execution of said first type of instruction when the address code output from the program counter does not designate any memory location in said first area.

BRIEF DESCRIPTION OF THE DRAWINGS

In the accompanying drawings:

FIG. 3 is a diagram showing an example of the detection unit;

FIGS. 4A and 4B are memory maps showing examples of memory area allocation; and

DETAILED DESCRIPTION OF THE PREFERRED EMBODIMENTS

Figure 1:
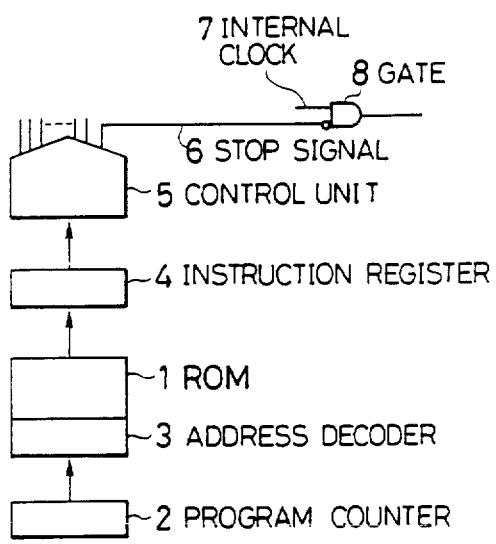
FIG. 1 is a block diagram showing a part of a conventional microcomputer.
Figure 2:
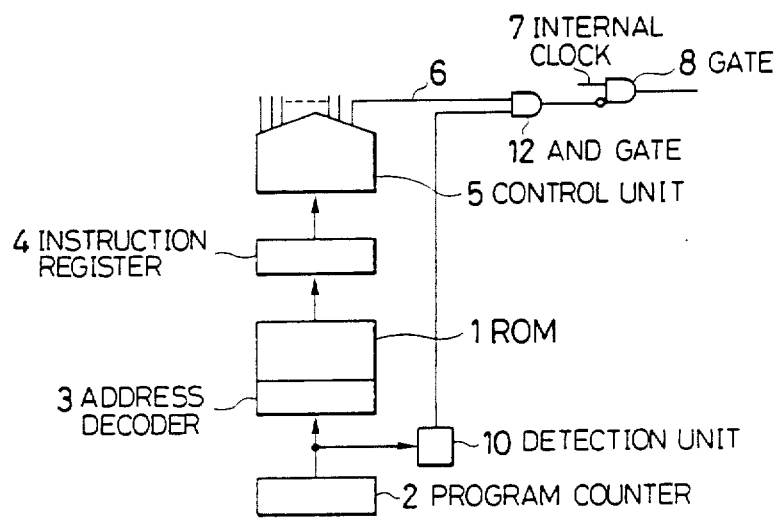
FIG. 2 ia a block diagram showing a part of a microcomputer of an embodiment of the invention.

A microcomputer embodying the invention is shown in FIG. 2, in which the same reference numerals as in FIG. 1 denote identical or similar components, so that their description is omitted.

A feature of the microcomputer is a provision of a protection circuit which comprises a detection unit 10 and an AND gate 12. The detection unit 10 receives as its inputs, outputs of the higher bits, e.g., 4th to 11th bits of the outputs of the program counter 2. The AND gate 12 receives, as one input thereof, a predetermined control signal, such as a stop signal 6, from the control unit 5 and, as another input thereof, the output of the detection unit 10.

An example of the detection unit 10 is shown in FIG. 3. It comprises an AND gate receiving the higher 8 bits (A4 through A11) of 12 bits A0 through A11 of the address code output from the program counter 2.

An example of a memory area allocation in a ROM 4 in an IC card is shown in FIG. 4A. Part A (16 bytes of address 4080 to 4095) is an area in which such important instructions as write instructions and stop instructions are stored. Part B (address 0 to 4079) is an area in which the remaining instructions are stored. In an IC card, it is usual that the area required for storing the important instructions is relatively small and occupies only 10 to 16 bytes of the entire 4096 bytes.

All the input bits A4 through A11 of the detection unit 10 are high when the program counter is designating an address of 4080 or of a higher value, so that the output of the detection unit 10 is high. When the program counter is designating an address of a value smaller than 4080, the output of the detection unit 10 is low.

When an instruction in part B is executed, the output of the program counter is smaller than 4080, so that the output of the detection unit 10 is low. Consider in this state, a stop signal 6 is erroneously made high. However, the AND gate 12 is closed because the output of the detection unit 10 is low, so that the stop signal 6 does not pass the AND gate 12. Thus, application of the stop signal to the gate 8 is prevented and the execution of the "stop" instruction erroneously produced is prevented. The gate 8 will therefore keep providing the clock signal from the clock 7.

When an instruction in part A is executed, the output of the program counter is 4080 or larger, so that the output of the detection unit 10 is high. If in this state a stop signal 6 is made high (either by correct operation or by error), this control signal passes through the AND gate 12 because the AND gate 12 is open as a result of the output of the detection unit 10 being high. The gate 8 will therefore halt supply of the signal from the clock 7 to various circuits. Thus the stop instruction is executed.

The erroneous production of the stop signal at the output of the control unit 5 may occur evenly throughout the entire memory locations, i.e., regardless of which of the memory locations are accessed. This is true for the present embodiment as well as for the prior art. The embodiment of the invention differs from the prior art in that erroneous production of the stop signal at the output of the control unit 5 during execution of an instruction in the memory locations of 0 to 4079 is detected and execution of such erroneous stop signal, e.g., application thereof to the gate 12, is prohibited. Only when the erroneous production of the stop signal occurs during execution of an instruction in a memory location in 4080 to 4095 in part A is such erroneous stop signal executed. Because the number of the memory locations in part A is small, the probability of the execution of the erroneous stop signal is greatly reduced. If all the memory locations are accessed evenly, the probability of the execution of the erroneous stop signal is reduced to 16/4096 or 0.4 percent.

In the embodiment described, important instructions are stored in part A of the address of a value 4080 or larger. Alternatively, part A may be at the memory location of the address value of 15 or smaller as shown in FIG. 4B. In this case, inverters inverting the higher 8 bits A4 to A11 may be provided and the AND gate of the detection unit may be connected to receive the outputs of the inverters. The combination of the inverters and the AND gate is considered to be equivalent to a NOR gate receiving the higher 8 bits.

In the embodiment described, the stop signal is taken as an example of an important control signal. But a similar arrangement for protection can be provided for other important control signals such as write signal.

Figure 5:
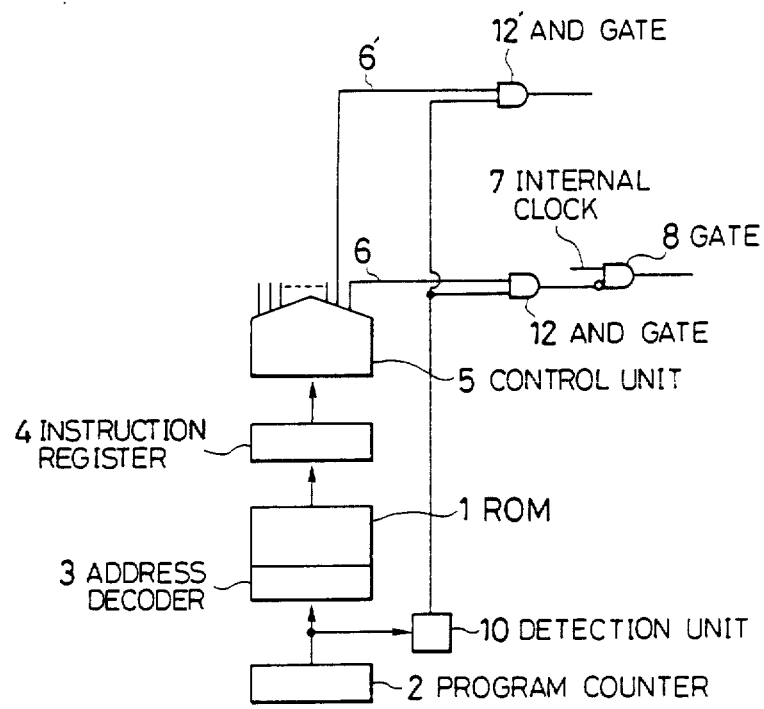
FIG. 5 is a block diagram showing another embodiment of the invention.

The output of the detection circuit can be delivered to two or more gates 12 and 12' for the respective control signals 6 and 6' as shown in FIG. 5.

This arrangement is particularly advantageous where two or more instructions respectively corresponding to important control signals are stored in the same area, such as part A, having memory locations identified by address codes formed of bits many of which (such as fourth to 11th bits) are identical.

In the embodiment described, the gate 12 comprises an AND gate. Alternatively, a tri-state gate may be used. Still alternatively a circuit having a latch function, such as a D-type filp-flop may be used. This is particularly useful where the output of the program counter 2 is changed to another (next) value before the production of the corresponding control signal is terminated. The latch function may alternatively be had by the detection circuit 10.

Instead of the AND gate in the detection circuit 10, a magnitude comparator comparing the output of the program counter and a predetermined value may be used.

What is claimed is:

1. A computer for executing a program stored therein, the program having a first type of instruction and a second type of instruction, comprising:
    a program memory having a first area for storing the first type of instruction and a second area for storing the second type of instruction,
    a program counter providing an address code,
    said program memory being responsive to said address code for producing an instruction code stored at a memory location designated by said address code,
    a control unit responsive to said instruction code from said program memory for producing a control signal corresponding to the first type of instruction for controlling computer operation, and
    protection means for suppressing the control signal produced by said control unit corresponding to the first type of instruction when said address code provided by said program counter does not designate a memory location in said first area.

2. A computer according to claim 1, wherein said protection means comprises detection means for detecting designation by said address code provided by said program counter of a memory location in said first area, and
    gate means for selectively blocking transmission of said control signal, said gate means being opened when said detection means detects designation by said address code of a memory location in said first area.

3. A computer according to claim 2, wherein
    said first area includes only those memory locations designated by address codes having higher bits which all have a logic value of "1", and
    said detection means comprises an AND gate having an input which receives all of said higher bits.

4. A computer according to claim 2, wherein said first area includes only those memory locations designated by address codes having higher bits which all have a logic value of "0", and
    said detection means comprises a NOR gate having an input which receives all of said lower bits.

5. A computer according to claim 2, wherein said first type of instruction includes a plurality of different control signals which are stored in said first area,
    said detection means producing a gate control signal when it detects designation of a memory location in said first area,
    a plurality of gate means for selectively blocking transmission of a respective plurality of control signals corresponding to said first type of instructions,
    said plurality of gate means being opened by said gate control signal.

6. A computer according to claim 1, wherein said protection means comprises a gate means for selectively stopping said control signal corresponding to said first type of instruction.

7. A computer according to claim 1, wherein said protection means comprises a gate means for preventing application of said control signal corresponding to said first type of instruction to an internal circuit controlled by said control signal.

8. A computer according to claim 1, wherein said control signal corresponding to said first type of instruction is a stop signal for stopping application of an internal clock to computer operations.

* * * * *